United States Patent
Kim et al.

(10) Patent No.: US 10,249,269 B2
(45) Date of Patent: Apr. 2, 2019

(54) SYSTEM ON CHIP DEVICES AND OPERATING METHODS THEREOF

(71) Applicant: Samsung Electronics Co., Ltd., Suwon-si, Gyeonggi-do (KR)

(72) Inventors: Sang-hee Kim, Suwon-si (KR); Jung-min Oh, Seoul (KR); Jin-seok Ha, Hwaseong-si (KR); Min-je Jun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 15/134,726

(22) Filed: Apr. 21, 2016

(65) Prior Publication Data

US 2016/0358590 A1    Dec. 8, 2016

(30) Foreign Application Priority Data

Jun. 3, 2015  (KR) .................. 10-2015-0078662

(51) Int. Cl.
| | | |
|---|---|---|
| *G09G 5/39* | (2006.01) | |
| *G06T 1/60* | (2006.01) | |
| *G09G 5/00* | (2006.01) | |

(52) U.S. Cl.
CPC .............. *G09G 5/39* (2013.01); *G06T 1/60* (2013.01); *G09G 5/001* (2013.01); *G09G 2340/02* (2013.01); *G09G 2350/00* (2013.01); *G09G 2360/08* (2013.01)

(58) Field of Classification Search
CPC ....... G06F 12/023; G06F 3/0656; G09G 5/39; G06T 1/60; G06T 9/00
See application file for complete search history.

(56) References Cited

U.S. PATENT DOCUMENTS

| | | | |
|---|---|---|---|
| 5,512,921 A | 4/1996 | Mital et al. | |
| 6,208,689 B1 | 3/2001 | Ohira et al. | |
| 7,548,657 B2 | 7/2009 | Deaven | |
| 7,705,852 B2 | 4/2010 | Blais | |
| 8,730,328 B2 | 5/2014 | Luo et al. | |
| 8,954,693 B2* | 2/2015 | Seo .................. | G06F 12/023 |
| | | | 711/161 |
| 9,177,393 B2* | 11/2015 | Teng ................... | G06T 9/00 |
| 9,406,149 B2* | 8/2016 | McAllister .......... | G06T 9/00 |
| 9,466,090 B2* | 10/2016 | Surti ................... | G06T 11/40 |
| 9,606,769 B2* | 3/2017 | Khan .................. | G06F 5/12 |
| 9,940,733 B2* | 4/2018 | Nilsson ............... | G06T 1/60 |
| 2011/0243469 A1* | 10/2011 | McAllister .......... | G06T 9/00 |
| | | | 382/239 |
| 2013/0179659 A1 | 7/2013 | Seo et al. | |
| 2013/0262705 A1 | 10/2013 | Imai et al. | |
| 2014/0219558 A1 | 8/2014 | Teng et al. | |
| 2014/0219573 A1 | 8/2014 | Teng et al. | |

FOREIGN PATENT DOCUMENTS

| | | |
|---|---|---|
| JP | 08102946 | 4/1996 |
| JP | 2000098993 | 4/2000 |
| JP | 2001186356 | 7/2001 |

* cited by examiner

*Primary Examiner* — Henry Tsai
(74) *Attorney, Agent, or Firm* — Myers Bigel, P.A.

(57) ABSTRACT

System on chip devices and methods of operating the system on chip devices are provided. An example method includes: setting a first characteristic by analyzing a request for allocation of a buffer memory of the system on chip device; allocating a first region of the buffer memory in response to the request for allocation of the buffer memory; and compressing or not compressing data provided to the first region, used on the first characteristic.

17 Claims, 15 Drawing Sheets

Region 1
(220_1)

Region 1
(220_1)

Region 2
(220_2)

SYSTEM ON CHIP DEVICES AND OPERATING METHODS THEREOF

CROSS-REFERENCE TO RELATED APPLICATION

This application claims priority under 35 USC § 119(a) to Korean Patent Application No. 10-2015-0078662, filed an Jun. 3, 2015, in the Korean Intellectual Property Office, the contents of which are incorporated herein by reference in the entirety.

BACKGROUND

1. Technical Field

Embodiments of the present inventive concepts relate to system on chip devices and operating methods thereof.

2. Discussion of Related Art

As the complexity of operations performed by a system on chip has increased, the memory bandwidth of the system on chip and the power consumption thereof have increased. In addition, the system on chip device may have a plurality of functional blocks such as master devices and slave devices. The system on chip device may further include a bus system which can connect to the Intellectual Property Blocks (IPs) and a memory that stores data such as, for example, image data to be displayed. When the data stored in the memory is accessed by the plurality of IPs through the bus system, a high memory bandwidth may be necessary for high performance of the system on chip.

SUMMARY

According to aspects of the inventive concepts, an operating method of a system on chip device performed under control of a processor, the operating method may include: setting a first characteristic by analyzing a request liar allocation of a buffer memory of the system on chip device; allocating a first region of the buffer memory in response to the request for allocation of the buffer memory; and compressing or not compressing data provided to the first region, based on the first characteristic.

According to aspects of the inventive concepts, an operating method of a system on chip device including, for execution of an application, a first Intellectual Property (IP) block configured to provide data to a first region of a buffer memory that is allocated and a second IP block configured to use the data stored in the first region, the operating method may include: checking, by the first IP block, a first flag indicating whether compression is possible or not; transmitting, by the first IP block, the data to the first region based on whether the first flag is activated, wherein the data is compressed or not compressed; determining whether to activate a second flag based on whether the data transmitted to the first region is compressed or not; determining, by the second IP block, whether to decompress data read from the first region or not based on whether the second flag is activated; and determining whether to activate the first flag based on at least one of an operation environment and an operation result of the second IP block.

According to aspects of the inventive concepts, a system on chip device may include: a buffer memory having a first region to which data to execute a first application is loaded; a producer configured to provide the data, to the buffer memory; and a consumer configured to receive the data from the buffer memory. The producer may be further configured to determine whether to compress data provided to the buffer memory based on a request for allocation of the memory buffer.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
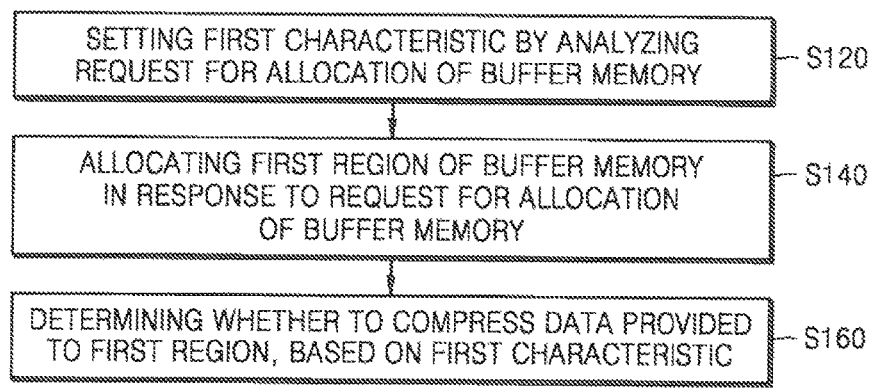
FIG. 1 is a flowchart illustrating operating methods of system on chip devices according to example embodiments of the inventive concepts.

The present inventive concepts will now be described more fully hereinafter with reference to the accompanying drawings, in which example embodiments are shown. The same or similar components may be designated by the same or similar reference numerals although they are illustrated in different drawings. The size and relative sizes of layers and regions may be exaggerated in the drawings for clarity. Detailed descriptions of constructions or processes known in the art may be omitted to avoid obscuring the subject matter of the present disclosure.

Although the terms first, second, etc, may be used herein to describe various elements, these elements are not limited by these terms. These terms are only used to distinguish one element from another. For example, a first signal could be referred to as a second signal, and, similarly, a second signal could be referred to as a first signal without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meanings as those commonly understood by one of ordinary skill in the art to which this present disclosure belongs. It will be further understood that terms, such as those defined in commonly used dictionaries, should be interpreted as having meanings that are consistent with their meanings in the context of the relevant art and/or as used herein, and will not be interpreted in an idealized or overly formal sense unless expressly so defined herein.

Expressions such as "at least one of," when preceding a list of elements, modify the entire list of elements and do not modify the individual elements of the list.

Figure 2:
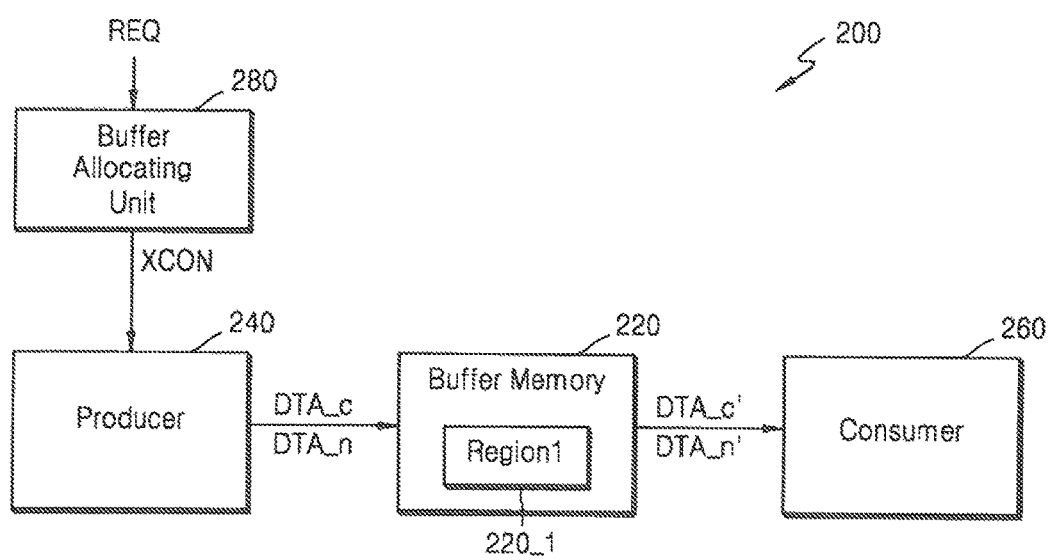
FIG. 2 illustrates system on chip devices according to example embodiments of the inventive concepts.

FIG. 1 is a flowchart illustrating operating methods of system on chip devices according to example embodiments of the inventive concepts. FIG. 2 illustrates the system on chip device 200 according to example embodiments of the inventive concepts.

Referring to FIG. 1, operating methods according to example embodiments of the inventive concepts include analyzing a request for allocation of a buffer memory so as to set a first characteristic (S120), allocating a first region of the buffer memory in response to the request for allocation of the buffer memory (S140), and determining whether to compress data provided to the first region, based on the first characteristic (operation S160). The operating method of FIG. 1 may be performed in a system on chip device 200 of FIG. 2.

Referring to FIG. 2, the system on chip device 200 may include a buffer memory 220, a producer 240, a consumer 260, and a buffer allocating unit 280.

Data used in an application executed by the system on chip device 200 may be loaded to the buffer memory 220. Data used in the application may be image data displayed on a display screen of an electronic device including the system on chip device 200. In some embodiments, the buffer memory 220 may be implemented as a frame buffer.

To execute an application, the producer 240 may supply data to the buffer memory 220, and the consumer 260 receives the data from the buffer memory 220. In other words, the producer 240 may write data to the buffer memory 220, and the consumer 260 may read the data from the buffer memory 220. The producer 240 and the consumer 260 may each be one of a plurality of Intellectual Property (IP) blocks included in the system on chip device 200. IP blocks included in the system on chip device 200 may operate only as the producer 240 or only as the consumer 260. In some embodiments, IP blocks included in the system on chip device 200 may operate both as the producer 240 and the consumer 260.

The buffer allocating unit 280 may allocate a partial region of the buffer memory 220 so that the producer 240 and the consumer 260 may write and read data used by an application to and from the buffer memory 220. For example, the buffer allocating unit 280 may allocate a first region 220_1 of the buffer memory 220 such that image data displayed during execution of a first application (e.g., a music reproduction application) may be written to or read from the first region 220_1 of the buffer memory 220. Hereinafter, for convenience of description, unless noted otherwise, a region of the buffer memory 220 that is allocated in response to a request REQ for allocation of the buffer memory 220 will be referred to as a first region 220_1.

The buffer allocating unit 280 may allocate the first region 220_1 based on the request REQ for allocation of the buffer memory 220. While the request REQ for allocation of the buffer memory 220 is illustrated as being applied from the outside of the buffer allocating unit 280 in FIG. 2, the example embodiments are not limited thereto. As will be described later, the request REQ for allocation of the buffer memory 220 may be generated based on a signal (information) received from an application. For example, the request REQ for allocation of the buffer memory 220 may be implemented using a function gralloc( ) of a software platform, such as the Android operating system.

For example, the request REQ for allocation of the buffer memory 220 may include information about data provided to the first region 220_1 to execute an application. For example, the request REQ for allocation of the buffer memory 220 may include information about an amount or format of image data that is to be displayed according to execution of the first application. Information about an amount of image data may include information about a width and height of the image data, and information about a format of the image data may include information about bytes needed to express pixels of the image data. For example, if a format is RGBAx8888, 4 bytes are required to express pixels of image data, and if a format is RGBx565, 2 bytes are required to express pixels of image data.

The request REQ for allocation of the buffer memory 220 may further include other various types of information. This will be described in detail later. The buffer allocating unit 280 may set the first region 220_1 having a size corresponding to a size and format of image data defined in the request REQ.

The producer 240 provides data to the first region 220_1 allocated as described above, and the data provided to the first region 220_1 may be used by the consumer 260. According to the system on chip device 200 and the operating method of FIG. 1, a first characteristic may be set based on the request REQ for allocation of the buffer memory 220 in operation S120, the first region 220_1 corresponding to the request REQ may be set in operation S140, and whether to compress data transmitted to the first region 220_1 may be determined in operation S160 to reduce a memory bandwidth according to data transmission even by using limited hardware resources. This will be described below.

Figure 3:
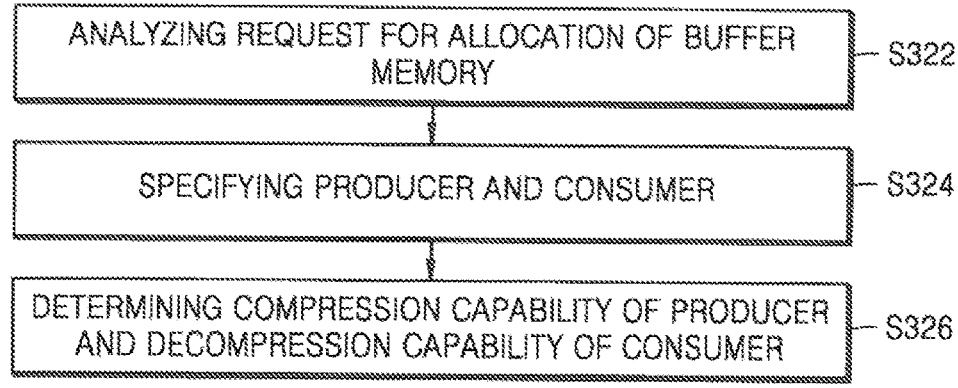
FIG. 3 is a flowchart illustrating methods of setting a first characteristic according to example embodiments of the inventive concepts.

FIG. 3 is a flowchart illustrating methods of setting a first characteristic according to example embodiments of the inventive concepts. Referring to ERGS. 2 and 3, a method of setting a first characteristic may include analyzing a request REQ for allocation of the buffer memory 220 in operation S322, specifying the producer 240 and the consumer 260 based on a result of the analyzing the request REQ in operation S324, and determining a compression capability of the producer 240 and a decompression capability of the consumer 260 in operation S326. The compression capability may indicate, for example, whether data compression is allowed or not and/or a compression rate of data. The decompression capability may indicate, for example, whether compressed data is to be decompressed and/or a decompression rate of the compressed data. The compression rate and decompression rate may be respectively set according to a compression algorithm and a decompression algorithm. The first characteristic may indicate compression characteristics, for example, whether to perform data compression or whether data compression is appropriate.

The request REQ for allocation of the buffer memory 220 may include information about the producer 240 that provides data to the first region 220_1 and the consumer 260 that receives data from the first region 220_1 in order to execute an application. The information may be represented as a SW Usage Flag.

Figure 4:
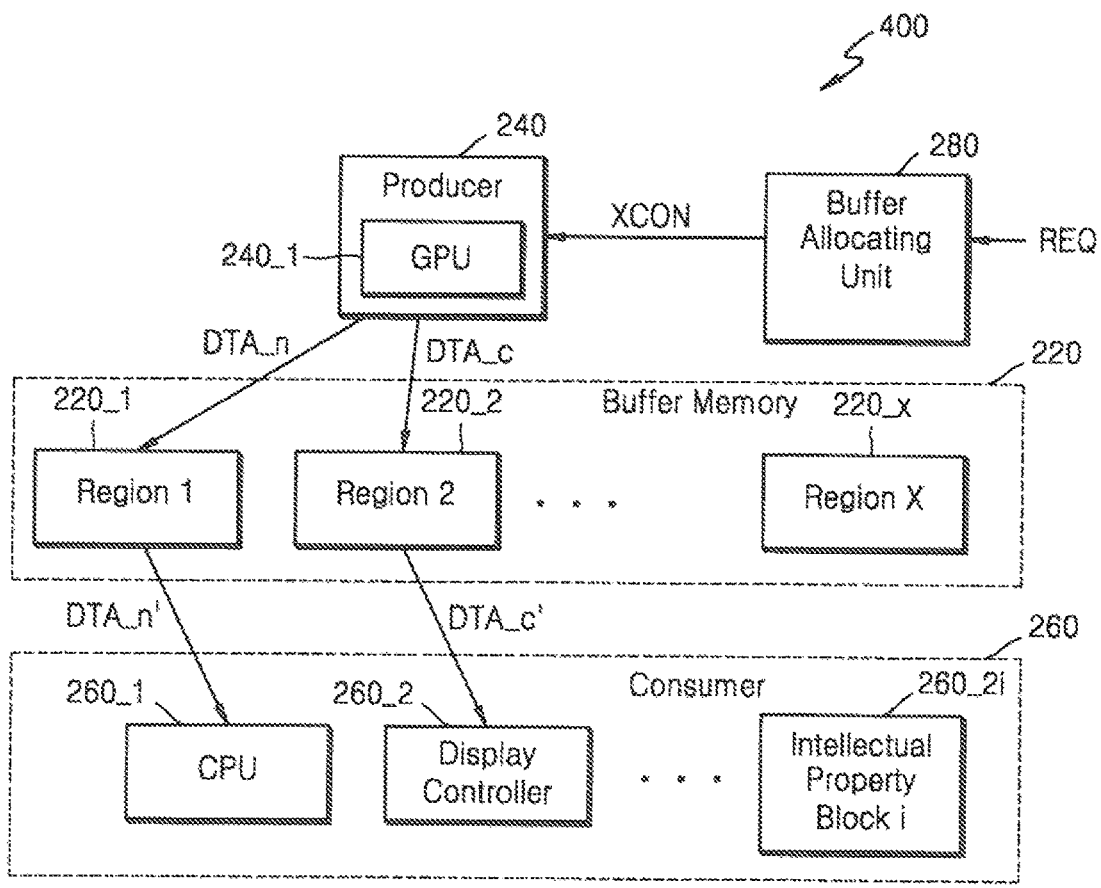
FIG. 4 illustrates a system on chip device according to other example embodiments of the inventive concepts.

FIG. 4 illustrates a system on chip device 400 according to other example embodiments of the inventive concepts. Referring to FIGS. 3 and 4, in the system on chip device 400, a request REQ for allocation of the buffer memory 220 may be generated for each of a plurality of applications. According to the example embodiment of FIG. 4, first through Xth regions 220_1 through 220_X of the buffer memory 220 may be respectively allocated upon multiple requests REQ for allocation of the buffer memory 220. For example, the first through Xth regions 220_1 through 220_X of the buffer memory 220 may be allocated such that compression characteristics (first characteristic) of at least two of the first through Xth regions 220_1 through 220_X of the buffer memory 220 are differently set. For example, the first region 220_1 of FIG. 4 may be set as a region that is not compressed. On the other hand, the second region 220_2 may be set as a region that is compressed.

Whether to compress respective regions of the buffer memory 220 may be determined based on compression capability and decompression capability of the producer 240 and the consumer 260 that are set according to the request REQ. FIG. 4 illustrates an example where a graphic processing unit (GPU) 240_1 is set as the producer 240 with respect to each of multiple requests REQ. However, the example embodiments are not limited thereto, and other IP blocks may also be set as the producer 240 in the system on chip device 400. FIG. 4 illustrates that the consumer 260 may be differently set with respect to different requests REQ. For example, a central processing unit (CPU) 260_1 may be set as a consumer 260_1 corresponding to the first region 220_1 and a display controller 260_2 may be set as a consumer 260_2 corresponding to the second region 220_2. Likewise, any other IP block 260_i may be set as a consumer 260_i.

The buffer allocating unit 280 may determine compression capability and decompression capability of the producer 240 and the consumer 260 set in operation S326. For example, the producer 240 may include a compression module to compress data. However, the CPU 260_1 may cot include a decompression module and thus may not be able to immediately use compressed data. In this case, even though data compressed by the GPU 240_1 is provided to the first region 220_1, in order for the CPU 260_1, which does not include a decompression module, to use the compressed data, the CPU 260_1 has to perform a decompression operation via software. As the CPU 260_1 may have to continuously access the buffer memou 220 to perform the decompression operation, even though the GPU 240_1 has reduced a memory bandwidth for transmitting data to the first region 220_1 by compressing the data the CPU 260_1 has to additionally access the buffer memory 220 to decompress the data, and thus, the memory bandwidth may be additionally increased. Furthermore, delay may be caused due to time consumed in the decompression operation implemented by software. In this case, the GPU 240_1 may transmit non-compressed data to the first region 220_1. On the other hand, the display controller 260_2 may include at least one decompression module and thus may immediately decompress compressed data and use the same. Thus, as compressed data is transmitted and received between the GPU 240_1, the second region 220_2, and the display controller 260_2, the memory bandwidth may be reduced.

The buffer allocating unit 280 transmits a control signal XCON corresponding to the first characteristic to the producer 240 based on the compression capability and the decompression capability with respect to the producer 240 and the consumer 260 that are set as above. For example, the buffer allocating unit 280 may generate a control signal XCON having a first value if the first characteristic indicates that data compression is efficient, and may generate a control signal XCON having a second value if the first characteristic indicates that data compression is not efficient. The producer 240 may transmit compressed data or non-compressed data to the first region 220_1 in response to the control signal XCON.

For example, when the producer 240 and the consumer 260 are respectively set as the CPU 240_1 and the CPU 260_1, the buffer allocating unit 280 may transmit a control signal XCON having the second value to the CPU 240_1, and the CPU 240_1 may transmit non-compressed data DTA_n to the first region 220_1 in response to the control signal XCON. The CPU 260_1 may perform an operation by using data DTA_n' that is not compressed and is stored in the first region 220_1. For example, when the producer 240 and the consumer 260 are respectively set as the CPU 240_1 and the display controller 260_2, the buffer allocating unit 280 may transmit a control signal having the first value to the GPU 240_1, and the GPU 240_1 may transmit compressed data DTA_c to the first region 220_1 in response to the control signal XCON. The display controller 260_2 may perform an operation by receiving data DTA_c' that is compressed and stored in the first region 220_1 and decompressing the same to use. A method performed by the consumer 260 to determine whether data is compressed or not will be described later.

Figure 5:
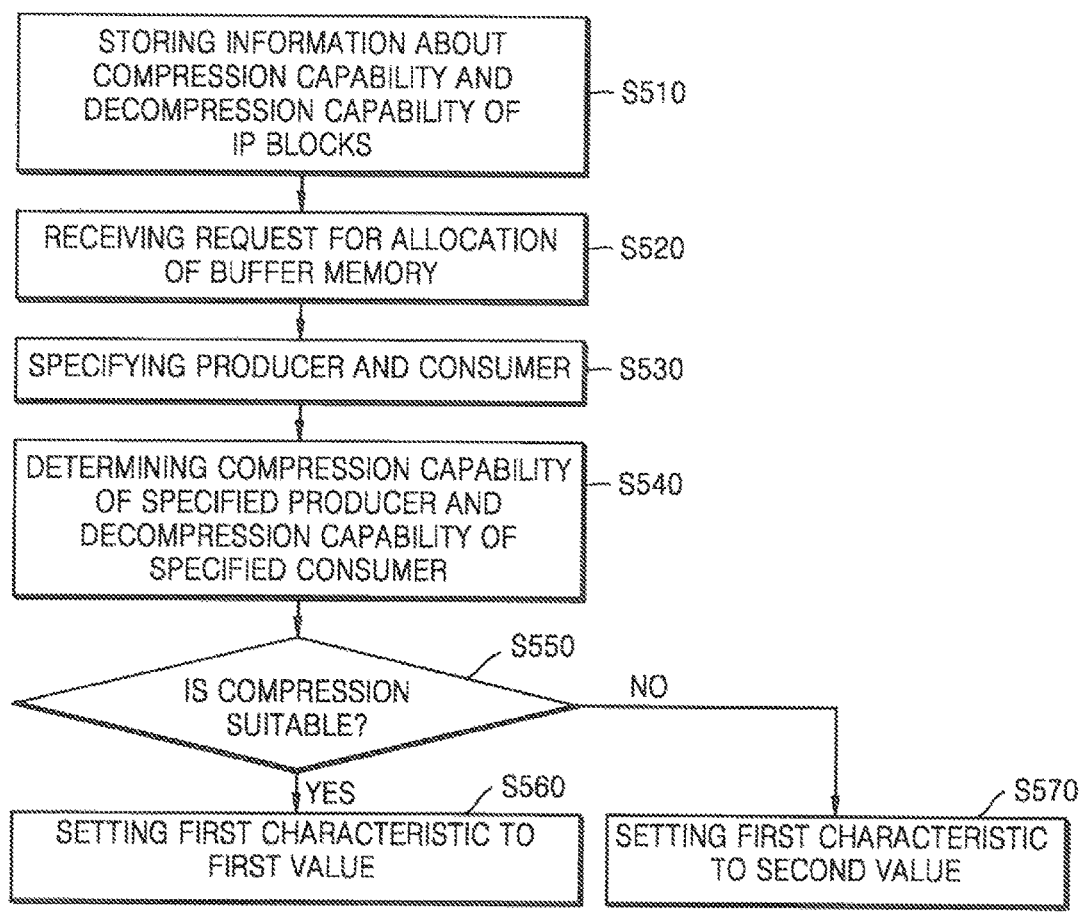
FIG. 5 illustrates an operating method of a system on chip device according to other example embodiments of the inventive concepts.

FIG. 5 illustrates a method of operating a system on chip device according to other example embodiments of the inventive concepts. An operating method of FIG. 5 may be performed, for example, on the system on chip device 200 of FIG. 2 or the system on chip device 400 of FIG. 4. However, the description herein will focus on an example embodiment in which the operating method is performed in the system on chip device 200 of FIG. 2, for convenience of description. Referring to FIGS. 2 and 5, the operating method may include storing information about compression capability and decompression capability of IP blocks in operation S510, receiving a request REQ for allocation of the buffer memory 220 in operation S520, specifying the producer 240 and the consumer 260 indicated by the request REQ in operation S530, determining the compression capability of the producer 240 that is specified and decompression capability of the consumer 260 that is specified in operation S540, determining whether it is suitable to compress data based on the compression capability of the producer 240 and the decompression capability of the consumer 260 in operation S550, setting a first characteristic to a first value when it is determined that it is suitable to compress data based on the compression capability of the producer 240 and/or the decompression capability of the consumer 260 (YES to operation S550) in operation S560, and setting the first characteristic to a second value when it is determined that it is not suitable to compress data based on the compression capability of the producer 240 and/or the decompression capability of the consumer 260 (NO to operation S550) in operation S570.

Operations S560 and S570 of setting the first characteristic to the first value or the second value in FIG. 5 may be the same as the operation of generating a control signal XCON corresponding to the first characteristic described with reference to FIG. 4 and being of the first value or the second value. In the operating method of FIG. 5, operation S530 of specifying the producer 240 and the consumer 260 according to the request REQ, operation S540 of determining the compression capability of the producer 240 and the decompression capability of the consumer 260, and operations S550, S560, and S570 of differently setting the first characteristic may be the same as those described with reference to FIG. 4. According to the operating method of FIG. 5, before receiving the request REQ in operation S520, compression and decompression capabilities of the IP blocks of the system on chip device 200 may be stored in operation S510. The compression and decompression capabilities of the IP blocks of the system on chip device 200 may be different from one another.

Figure 6A:
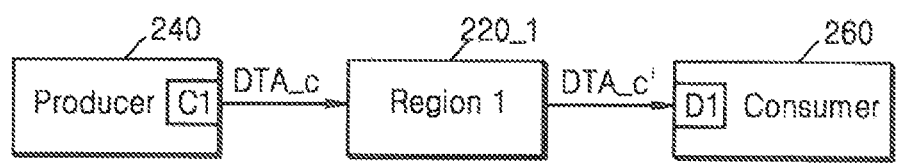
FIGS. 6A through 6C illustrate compression and decompression capabilities of Intellectual Property (IP) blocks according to example embodiments of the inventive concepts.
Figure 6B:
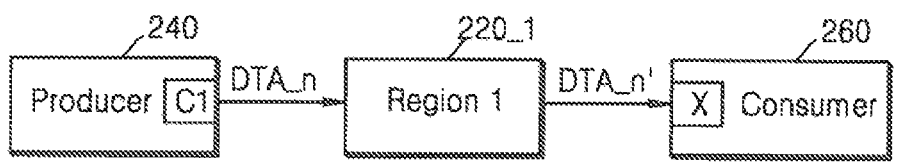
Figure 6C:
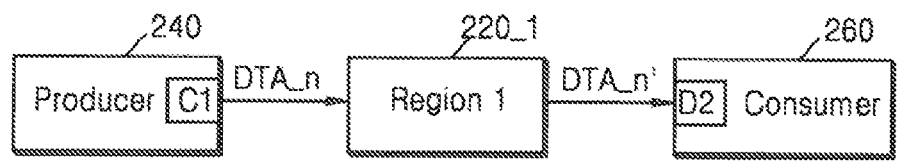

FIGS. 6A through 6C illustrate compression and decompression capabilities of IP blocks according to example embodiments of the inventive concepts. In FIGS. 6A-6C, IP blocks related to the first region 220_1 among the IF blocks are illustrated as the producer 240 and the consumer 260. As shown in FIG. 6A, the producer 240 may include a first compression module C1, and the consumer 260 may include a first decompression module D1. Each of the first compression module C1 and the first decompression module D1 may be implemented using hardware. A plurality of compression modules and a plurality of decompression modules may be included in the IP blocks.

A compression algorithm performed in the first compression module C1 and a decompression algorithm performed in the first decompression module D1 may be the same. When an arbitrary compression algorithm and an arbitrary decompression algorithm are the same, data compressed using the arbitrary compression algorithm can be decompressed using the arbitrary decompression algorithm. Referring to FIG. 6A, for example, the producer 240 may transmit compressed data DTA_c to the first region 220_1, and the consumer 260 may receive data DTA_c' stored in the first region 220_1 and decompress the same. Thus, a memory bandwidth may be reduced.

On the other hand, referring to FIGS. 6B and 6C, the producer 240 may transmit non-compressed data DTA_n to the first region 220_1, and the consumer 260 may receive data DTA_n' that is not compressed and is stored in the first region 220_1 and use the same. In FIG. 6B, the producer 240 includes a first compression module C1, but the consumer 260 does not include a decompression module. In FIG. 6C, while the consumer 260 includes a second decompression module D2, the second decompression module D2 may operate according to a different algorithm from that of the first decompression module C1 included in the producer 240. In other words, data compressed using the first compression module C1 cannot be decompressed using the second decompression module D2. In both cases, the consumer 260 cannot use data compressed by the producer 240.

Information about compression or decompression capabilities of various IP blocks as described above may be stored in an electronic device in which the system on chip device 200 or 400 is included. The buffer allocating unit 280 may set a compression characteristic associated with the first region 220_1 or whether to compress data provided to the first region 220_1 by using the stored information.

Figure 7:
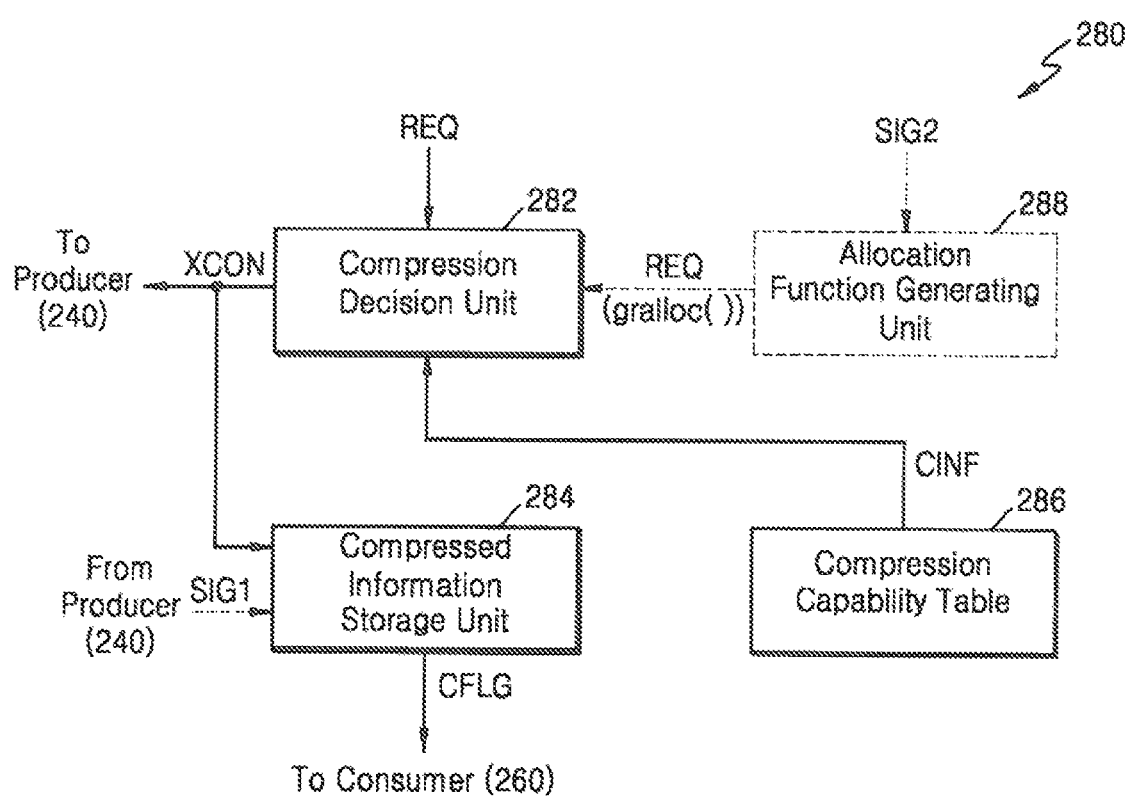
FIG. 7 illustrates a buffer allocating unit according to example embodiments of the inventive concepts.

FIG. 7 illustrates a buffer allocating unit 280 according to example embodiments of the inventive concepts. Referring to FIG. 7, the buffer allocating unit 280 may include a compression decision unit 282. The compression decision unit 282 may set a first characteristic by analyzing a request REQ, and generate a control signal XCON corresponding to the first characteristic and transmit the same to the producer 240.

The buffer allocating unit 280 may further include a compressed information storage unit 284. The compressed information storage unit 284 may store information about whether data provided to the first region 220_1 is compressed. The compressed information storage unit 284 may determine whether data provided to the first region 220_1 is compressed or not, based on the control signal XCON. In some embodiments, the compressed information storage unit 284 may receive a first signal SIG1 from the producer 240 that compresses data and transmits the data to the first region 220_1, to determine whether data is compressed. The compressed information storage unit 284 may store, as a flag, information about whether data provided to the first region 220_1 is compressed. For example, if data provided to the first region 220_1 is compressed, a flag bit may be activated to be 1, and if data provided to the first region 220_1 is not compressed, a flag bit may be inactivated to be 0. Information that is stored in the compressed information storage unit 284 and indicates whether data is compressed, that is, a compression flag CFLG, may be used by the consumer 260. The consumer 260 may determine whether data is compressed based on the compression flag CFLG when reading data from the first region 220_1.

The buffer allocating unit 280 may further include a compression capability table 286. The compression capability table 286 may store information about compression or decompression capabilities of IP blocks described above. The compression capability table 286 may include information about compression capabilities or decompression capabilities of IP blocks. The compression capability table 286 may be stored in a nonvolatile memory of an electronic device in which the system on chip device 200 is included, instead of being stored in the buffer allocating unit 280, and may be loaded to a system memory of the system on chip device 200 to be used, when the system on chip device 200 is activated.

Instead of receiving a request REQ from the outside, the buffer allocating unit 280 may include an allocation function generator 288 to generate a request REQ. The allocation function generator 288 may receive a second signal SIG2 about allocation of the buffer memory 220 from an application. The second signal SIG2 may include information about a size of data and a format of data. The allocation function generator 288 may generate a function gralloc( ) as a request REQ. The function gralloc( ) is a vendor-supplied library and involves a graphic buffer, that is, a frame buffer in allocation. To this end, the function gralloc( ) may include information such as a size of data, a format of data, SW usage flags, etc. The first region 220_1 may be allocated according to the function gralloc( ).

Figure 8A:
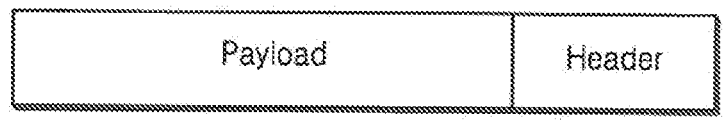
FIGS. 8A and 8B illustrate allocation of a first region according to example embodiments of the inventive concepts.
Figure 8B:
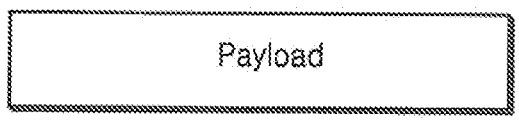
Figure 8B:
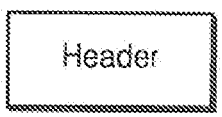

FIGS. 8A and 8B illustrate allocation of a first region 220_1 according to example embodiments of the inventive concepts. Referring to FIGS. 2, 8A and 8B, the first region 220_1 is allocated according to a size of data indicated in a request REQ. For example, as shown in FIG. 8A, the first region 220_1 may be allocated to have a size including a header that includes information such as compression characteristics and a payload to which data is loaded. Alternatively, as shown in FIG. 8B, the first region 220_1 may be allocated have a size of a payload to which data is loaded, and an additional region of the buffer memory 220 may be allocated to store a header. For example, a second region 220_2 that follows the first region 220_1 may be allocated to store a header.

An example embodiment in which compression characteristics (first characteristic) is set based on the operations of the producer 240 and the consumer 260 is described above. However, the example embodiments are not limited thereto. Compression characteristics may also be set based on data information defined in a request REQ. This will be described below.

Figure 9:
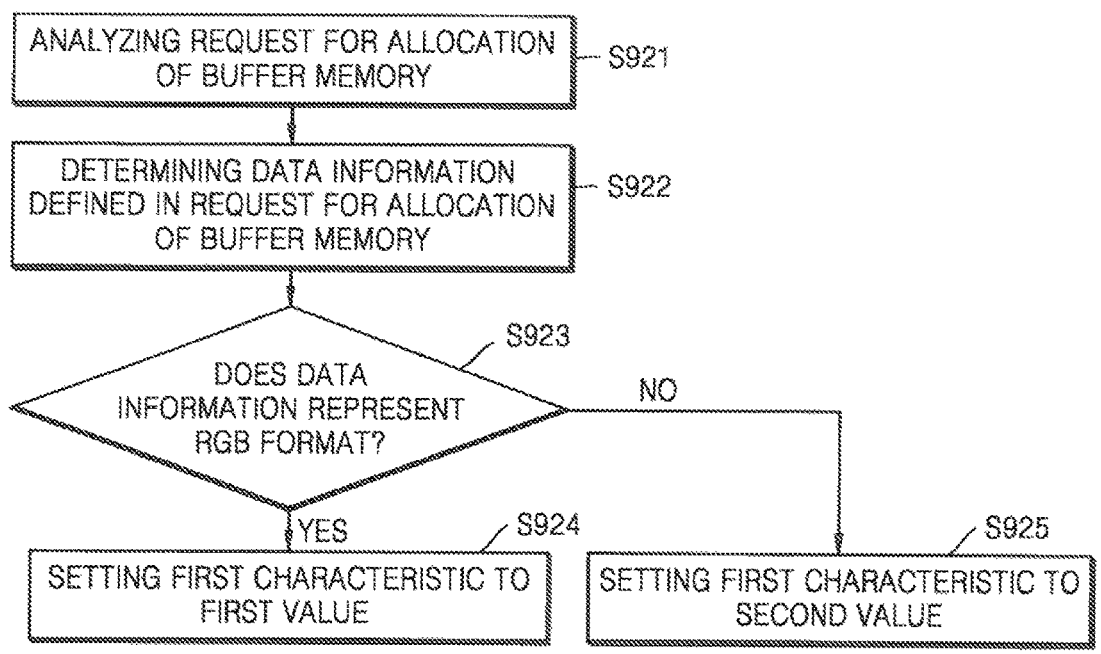
FIGS. 9 through 11 are flowcharts illustrating methods of setting a first characteristic according to other example embodiments of the inventive concepts.
Figure 10:
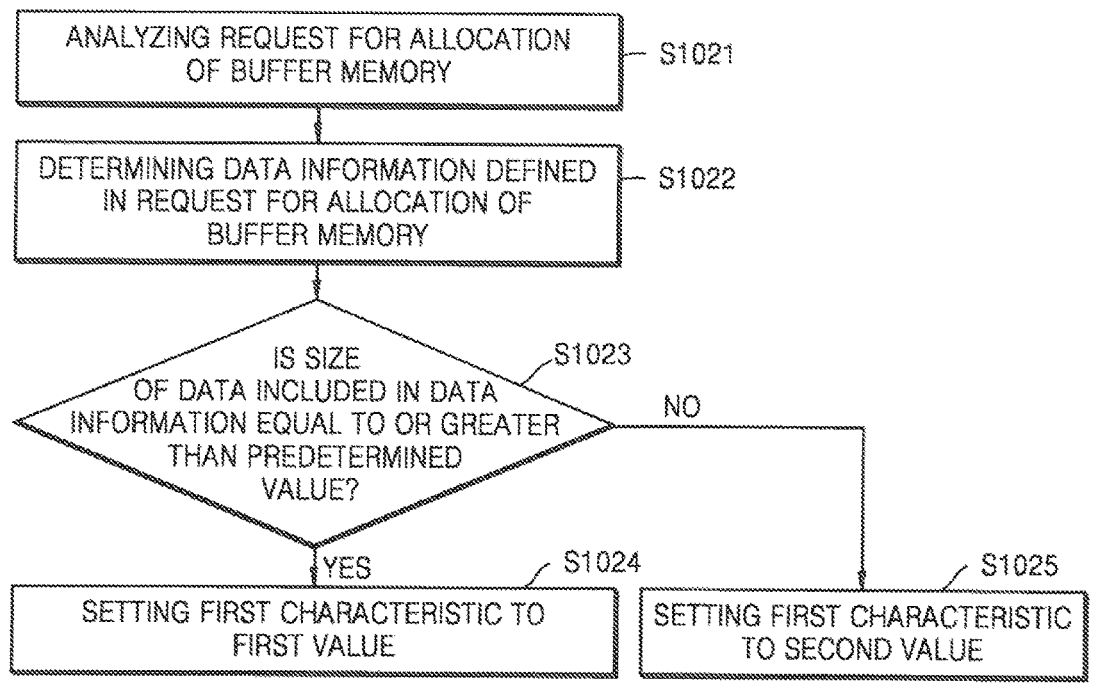
Figure 11:
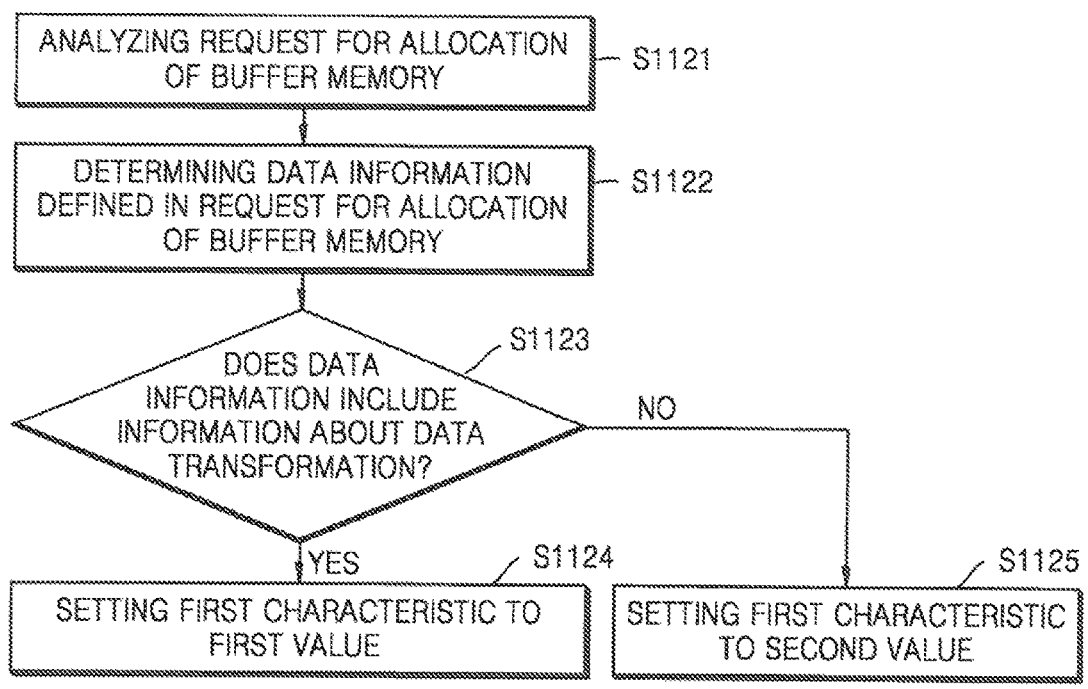

FIGS. 9 through 11 are flowcharts illustrating methods of setting a first characteristic according to other example embodiments of the inventive concepts. First, referring to FIGS. 2 and 9, a method of setting a first characteristic may include analyzing a request REQ regarding allocation of the buffer memory 220 in operation S921, determining data information defined in the request REQ regarding allocation of the buffer memory 220 in operation S922, determining whether the data information represents a Red Green Blue (RGB) format in operation S923, setting a first characteristic to a first value if the data information represents a RGB format (YES to operation S923) in operation S924, setting the first characteristic to a second value if the data information does not represent a RGB format (NO to operation S923) in operation S925.

As described above, the request REQ may include information about a data format, and whether the data format is a RGB format or a YUV format may be determined. Y of YUV refers to a luminance signal, and U and V of YUV denote central axes of two subcarriers used in a Phase Alternation by Line System (PAL) method. A compression efficiency of a RGB format is higher than that of a YUV format. Although resources that are consumed in compression and decompression are used, a memory bandwidth may be reduced by compressing only data having a relatively high compression efficiency. Operations S923, S924, and S925 of differently setting a value of the first characteristic according to respective data formats may be performed as described above.

Referring to FIGS. 2 and 10, a method of setting a first characteristic may include analyzing a request REQ regarding allocation of the buffer memory 220 in operation S1021, determining data information defined in a request REQ regarding allocation of the buffer memory 220 in operation S1022, determining whether a size of data included in the data information is equal to or greater than a predetermined value A in operation S1023, setting a first characteristic to a first value if the size of data included in the data information is equal to or greater than the value A (YES to operation S1023) in operation S1024, and setting the first characteristic to a second value if the size of data included in the data information is less than the value A (NO to operation S1023) in operation S1025.

Like the method illustrated with reference to FIG. 9, data information defined in the request REQ may be used in the method illustrated with reference to FIG. 10. However, according to the method illustrated with reference to FIG. 10, the first characteristic may be differently set according to a size of data. For example, if a size of displayed data is smaller than a predetermined value, loss due to additional performance overhead may be greater than a gain from a reduction in a memory bandwidth due to compression.

Next, referring to FIGS. 2 and 11, a method of setting a first characteristic may include analyzing a request REQ regarding allocation of the buffer memory 220 in operation S1121, determining data information defined in the request REQ regarding allocation of the buffer memory 220 in operation S1122, determining whether the data information includes information about data transformation in operation S1123, setting a first characteristic to a first value if the data information includes information about data transformation (YES to operation S1123) in operation S1124, and setting the first characteristic to a second value if the data information does not include information about data transformation (NO to operation S1123) in operation S1125. Data transformation may indicate, for example, scaling, rotating or cropping of original data.

Like the method illustrated with reference to FIG. 9, data information defined in the request REQ may be used in the method illustrated with reference to FIG. 11. However, according to the method illustrated with reference to FIG. 11, the first characteristic may be differently set according to whether data is transformed. For example, the request REQ may include information about performing data transformation such as scaling, rotating or cropping. When data that is to be transformed is compressed, a quality of the data required when the data is decompressed may not be secured. However, according to the method illustrated with reference to FIG. 11, a memory bandwidth may be reduced according to data compression, and data quality may be secured at the same time.

As described above, according to the system on chip devices and the methods of operating the system on chip devices according to the example embodiments of the inventive concepts, whether to compress data may be differently set based on characteristics of data provided to the buffer memory 220 or decompression capability of IP blocks that use data of the buffer memory 220 so that an increase in an amount of data (memory bandwidth) that is input or output to the buffer memory 220 per a standard time may be prevented even if complexity of a scenario of operations performed in the system on chip device 200 or image resolution are increased. Accordingly, according to the system on chip devices and the methods of operating the system on chip devices according to the example embodiments of the inventive concepts, limitation on operation scenarios due to art increase in power consumption in the system on chip device 200 and an increase in time for using the buffer memory 220 may be reduced or prevented.

Although it has been described in each of the example embodiments that whether to compress data may be determined according to a single condition, the example embodiments are not limited thereto. Thus, whether to compress data or not may be set according to at least two conditions and data compression may be performed according to the set conditions according to the system on chip devices and the methods of operating the system on chip devices according to the example embodiments of the inventive concepts. In some embodiments, data compression may be performed when compression capability or decompression capability of the producer 240 and the consumer 260 described above are satisfied and when at least one of the conditions of the data information of FIGS. 9 through 11 is satisfied. In some embodiments, data may be compressed when the consumer 260 is the display controller 260_2 of FIG. 4, and a data format is a RGB format, and a data size is equal to or greater than a value A.

In addition, while the example embodiments in which whether to compress data is set based on the request REQ according to allocation of the buffer memory 220 is described above, the example embodiments are not limited thereto. For example, whether to compress data that is transmitted to the first region 220_1 allocated to the buffer memory 220 or to the buffer memory 220 may be differently set based on an operation environment or an operation result of a system on chip device (or IP blocks of the system on chip device). This will be described below.

Figure 12:
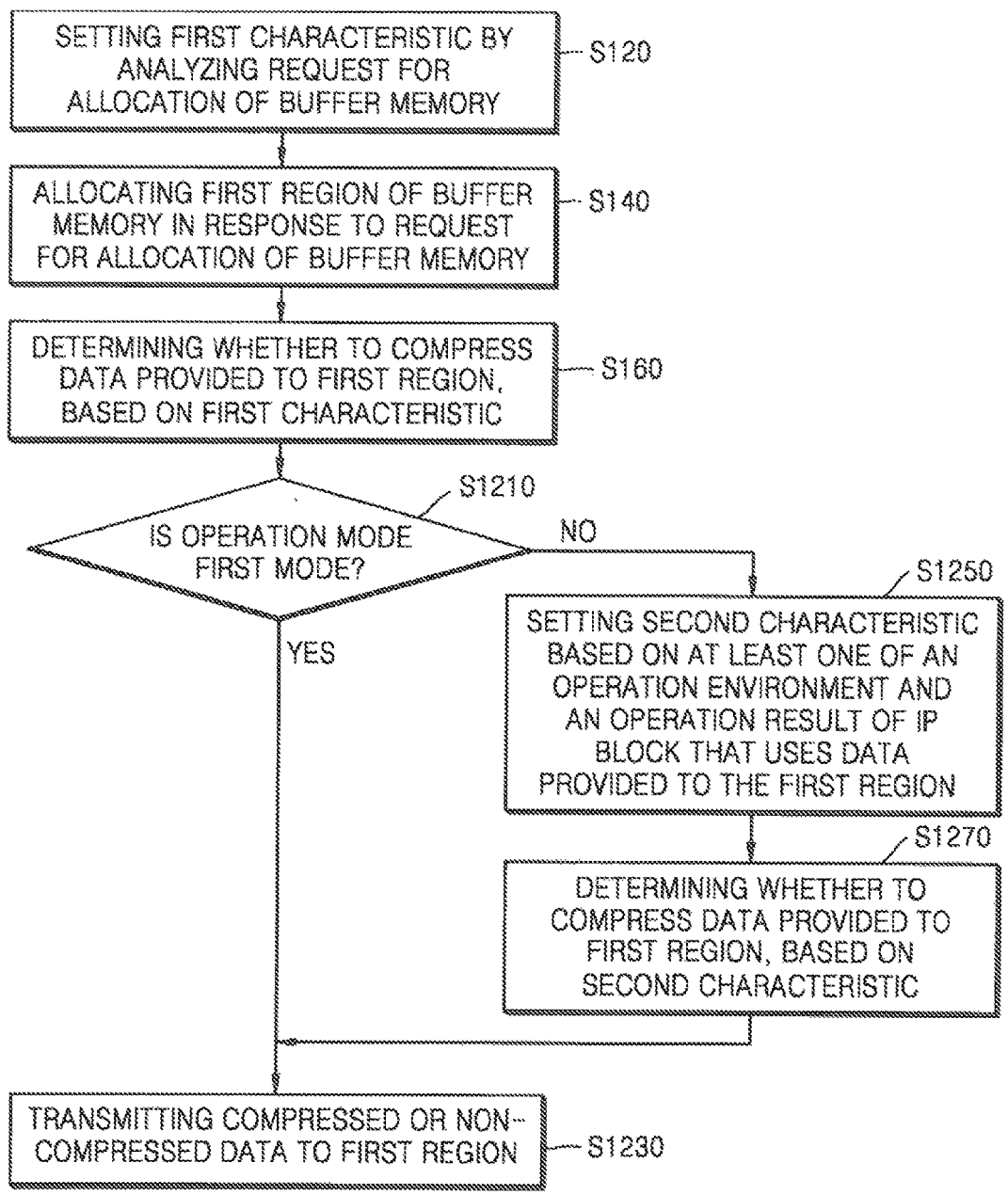
FIG. 12 is a flowchart illustrating an operating method of a system on chip device according to other example embodiments of the inventive concepts.

FIG. 12 is a flowchart illustrating an operation method of a system on chip device according to other example embodiments of the inventive concepts. Referring to FIG. 12, an operating method of a system on chip device may be performed in the system on chip device 200 of FIG. 2 or the 400 of FIG. 4. However, the description herein will focus on an example embodiment in which the operating method is performed in the system on chip device 200 of FIG. 2, for convenience of description. Referring to FIGS. 2 and 12, according to the operating method of the system on chip device 200, like the method of FIG. 1, a first characteristic may be set based on a request REQ regarding allocation of the system on chip device 200 and, then, whether to compress data may be differently set in operations S120, S140, and S160. Also, in a first mode (YES to operation S1210), data that is compressed or not compressed according to a result of the setting is transmitted to the first region 220_1 in operation S1230.

However, according to the operating method illustrated with reference to FIG. 12, if an operation mode is not the first mode (NO to operation S1210), whether to compress data may be differently set based on an operation environment or an operation result of the system on chip device 200 or IP blocks of the system on chip device 200 instead of the request REQ regarding allocation of the buffer memory 220. To this end, if it is not the first mode (NO to operation S1210), the method illustrated with reference to FIG. 12 may include setting a second characteristic based on at least one of an operation environment and an operation result of IP blocks that use data provided to the first region 220_1 in operation S1250, and differently setting whether to compress data provided to the first region 220_1 based on the second characteristic in operation S1270. Like the first characteristic, the second characteristic may also indicate whether compression is allowed or not and whether compression is appropriate or not. However, the second characteristic may be set to a different value from that of the first characteristic.

The first mode may be set by, for example, the producer 240 or the consumer 260. Alternatively, the first mode may be set according to set up information stored in the system on chip device 200 or a register set or the like of an electronic device in which the system on chip device 200 is included. The first mode may be set according to a required reduction amount of a memory bandwidth to provide usable resources or scenarios of the system on chip device 200. For example, even when it is determined not to perform compression based on the request REQ in operation S160 and whether to compress data is determined by considering a case when resources for performing decompression are not sufficient, the first mode may be inactivated (NO to operation S1210). This will be described below.

When four objects are to be displayed on a display screen of an electronic device including the system on chip device 200, and only three decompression modules are included in the display controller 260_2 that is in charge of the displaying, the compression decision unit 282 may analyze the request REQ and determine that compression is not suitable. Nevertheless, if the first mode is inactivated, the compression decision unit 282 may determine to perform compression in operations S1250 and S1270. For example, the display controller 260_2 may control the decompression modules such that two of the decompression modules respectively decompress two objects having a relatively large size, among the four objects, and the remaining decompression module decompresses two objects of the rest having a relatively small size. For example, if a screen displaying an icon and a time on a background screen of an electronic device is displayed, the background screen, the icon, and the time may each be referred to as an object.

Alternatively, even when it is determined to perform compression based on the request REQ in operation S160, if overhead is additionally generated compared to a reduction in a memory bandwidth due to compression, the first mode may be inactivated (NO to operation S1210). For example, if a variation in a value of pixels of data that is determined to be compressed based on the request REQ is large, that is, if data shows a complicated image, a compression ratio may be relatively low. In this case, the display controller 260_2 may determine not to perform compression in operations S1250 and S1270.

In order to perform the above-described operation, information regarding whether to compress data has to be exchanged via handshaking between the producer 240 and the consumer 260. This will be described below.

Figure 13:
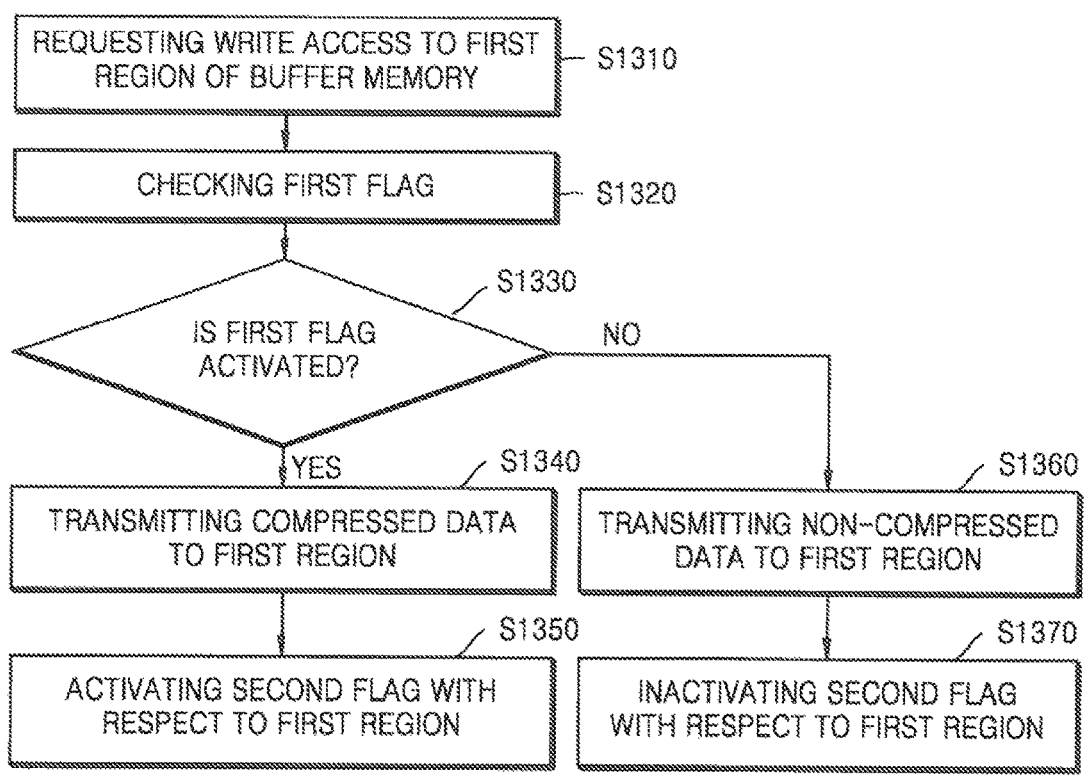
FIGS. 13 and 14 respectively are flowcharts illustrating operating methods of a producer and a consumer when handshaking occurs between the producer and the consumer according to example embodiments of the inventive concepts.
Figure 14:
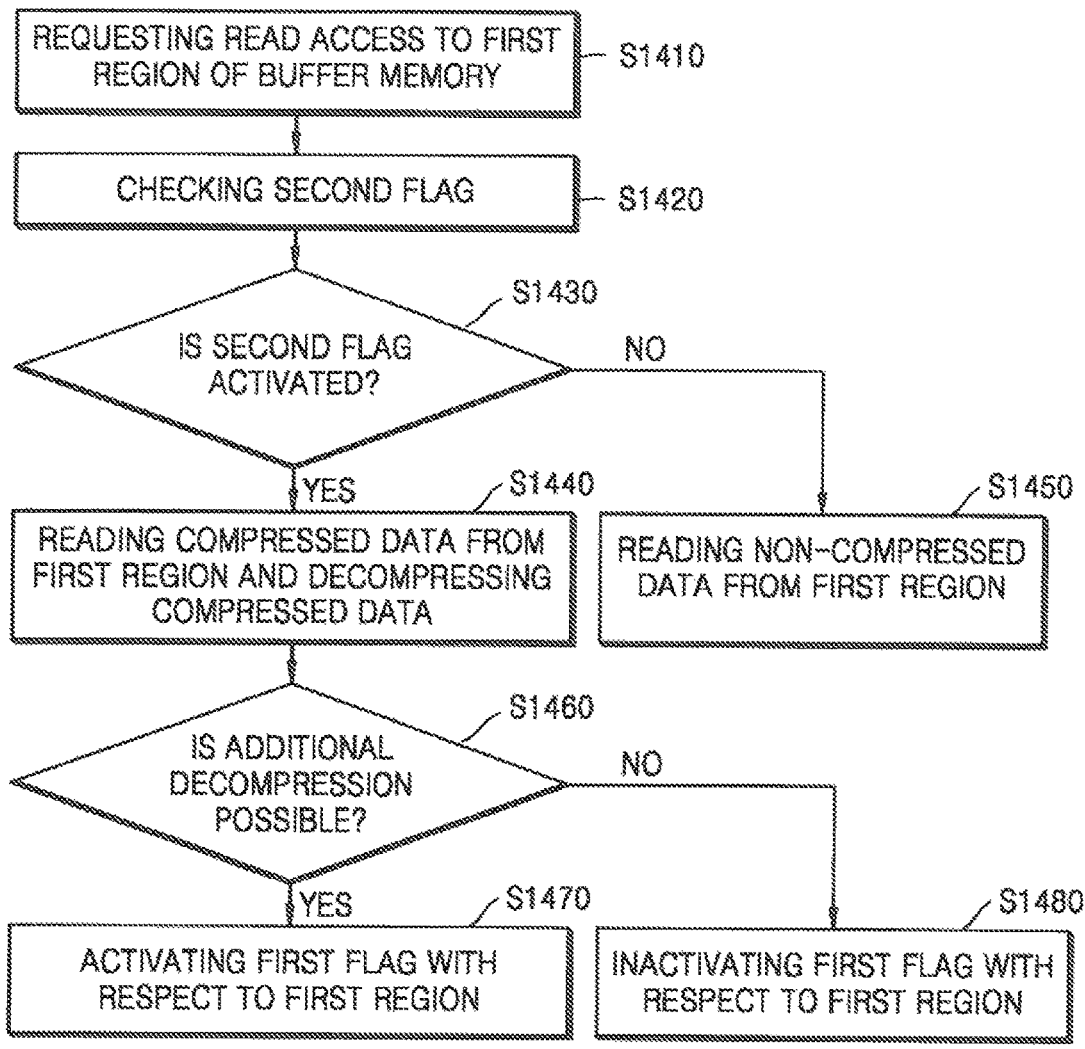

FIGS. 13 and 14 are respectively flowcharts illustrating methods of operating the producer 240 and the consumer 260 to perform handshaking between the producer 240 and the consumer 260 according to some example embodiments of the inventive concepts. Referring to FIGS. 2 and 13, a method of operating the producer 240 illustrated with reference to FIG. 13 may include requesting an access for writing data to the first region 220_1 of the buffer memory 220 in operation S1310, checking a first flag in operation S1320, transmitting compressed data DTA_c to the first region 220_1 if the first flag is activated (YES to operation S1330) in operation S1340, activating a second flag with respect to the first region 220_1 in operation S1350, transmitting non-compressed data DTA_n to the first region 220_1 if the first flag is not activated (NO to operation S1330) in operation S1360, and inactivating the second flag with respect to the first region 220_1 in operation S1370.

The first flag may indicate whether compression is possible or not. The first flag may be activated or inactivated by the consumer 260. The first flag may be stored in the compressed information storage unit 284 shown in FIG. 7 or in an additional space. The first flag may be set by the consumer 260 based on an operation environment or an operation result or the like. The operation environment may indicate a decompression resource included in the consumer 260, that is, whether a decompression module is included or not, performance of the decompression module, or the number of decompression modules. The operation result may indicate a compression ratio or the like. In the above-described example, if the display controller 260_2 is able to decompress four objects on a display screen by using three decompression modules, the first flag may be activated.

The second flag indicates whether compression is performed or not. The second flag may be activated or inactivated by the producer 240. The second flag may be a compression flag CFLG of FIG. 7. If the first flag is activated (YES to S1330), compressed data DTA_c may be stored in the first region 220_1, and thus the second flag may be activated to show that data is compressed (S1350). If the first flag is inactivated (NO to S1330), compression may not be possible or not suitable, and thus compression is not to be performed (S1360). As compression is not to be performed, the second flag may be inactivated (S1370) so as to indicate that compression is not to be performed.

Next, referring to FIGS. 2 and 14, a method of operating the consumer 260 may include requesting an access for reading data from the first region 220 of the buffer memory 220 (S1410), checking a second flag (S1420), if the second flag is activated (YES to S1430), reading data DTA_c' that is compressed and stored in the first region 220_1 to thereby decompress the data $DTA_Lc'$ (S1440), and if the second flag is not activated (NO to S1430), reading data DTA_n' that is not compressed and is stored in the first region 220_1 (S1450). That is, the consumer 260 may cheek the second flag to thereby determine whether data is compressed or not.

The method of operating the consumer 260 illustrated with reference to FIG. 14 determines, if the compressed data is read and decompressed in operation S1440, whether the consumer 260 is able to additionally process compressed data. That is, whether additional decompression is possible or not is determined in operation S1460. Whether the consumer 260 is able to process compressed data may be set based on an operation environment or an operation result or the like as described above. When additional decompression is possible (YES to in operation S1460), the consumer 260 activates a first flag with respect to the first region 220_1 in operation S1470. As described above, when the first flag is activated, the producer 240 may perform additional compression. On the other hand, the consumer 260 may inactivate the first flag with respect to the first region 220_1 in operation S1480.

As described above, according to the system on chip devices and the methods of operating the system on chip devices according to the example embodiments of the inventive concepts, hardware resources may be freely operated, by determining whether to compress data, via handshaking between the producer 240 providing data to a frame buffer according to data processing and the consumer 260 that uses data provided to the frame buffer, thereby providing an optimum solution.

Figure 15:
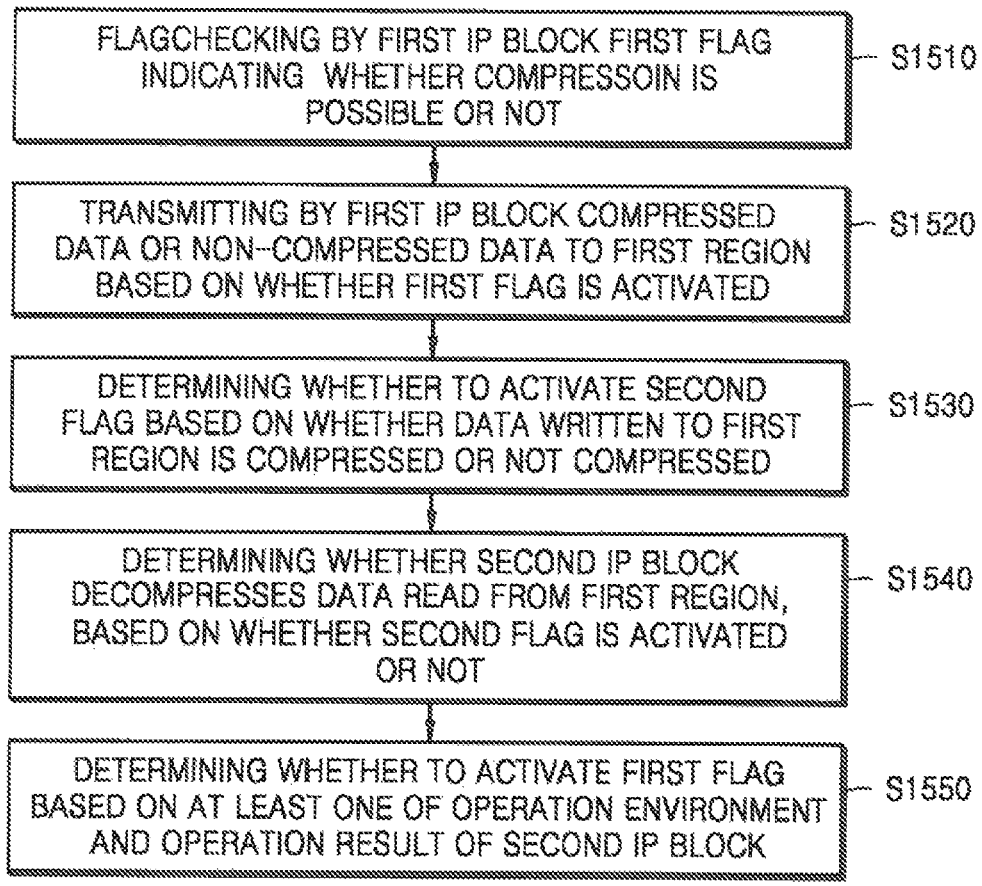
FIG. 15 is a flowchart illustrating an operating method of a system on chip device according to other example embodiments of the inventive concepts.

FIG. 15 is a flowchart illustrating a method of operating a system on chip device according to other example embodiments of the inventive concepts. A method of operating a system on chip device illustrated with reference to FIG. 15 may be performed in the system on chip device 200 of FIG. 2 or the 400 of FIG. 4. However, for convenience of description, the description herein will focus on an example embodiment in which the method of operating a system on chip device illustrated with reference to FIG. 15 is performed in the system on chip device 200 of FIG. 2. In the example embodiment of FIG. 15, the producer 240 and the consumer 260 of FIG. 2 will be referred to as a first IP block 240 and a second IP block 260, respectively.

Referring to FIGS. 2 and 15, the method of operating the system on chip device 200 illustrated with reference to FIG. 15 may include checking a first flag before the first IP block 240 writes data to the first region 220_1 of the buffer memory 220 in operation S1510, transmitting by the first IP block 240 compressed data or non-compressed data to the first region 220_1 based on whether the first flag is activated in operation 31520, determining whether to activate a second flag based on whether the data written to the first region 220_1 is compressed or not in operation S1530, determining whether the second IP block 260 decompresses data read from the first region 220_1 or not based on whether the second flag is activated in operation S1540, and determining whether to activate the first flag based on at least one of an operation environment and an operation result of the second IP block 260 in operation S1550.

As described above, the first IP block 240 stores compressed data DTA_c in the first region 220_1 only when the first flag which indicates that compression is possible is activated, and activates the second flag so as to indicate that the compressed data DTA_c is stored. When reading data from the first region 220_1, if the second flag is activated, the second IP block 260 decompresses compressed data DTA_c' to use the same. In addition, the second IP block 260 activates the first flag only when additional decompression is possible in operation S1550.

Figure 16:
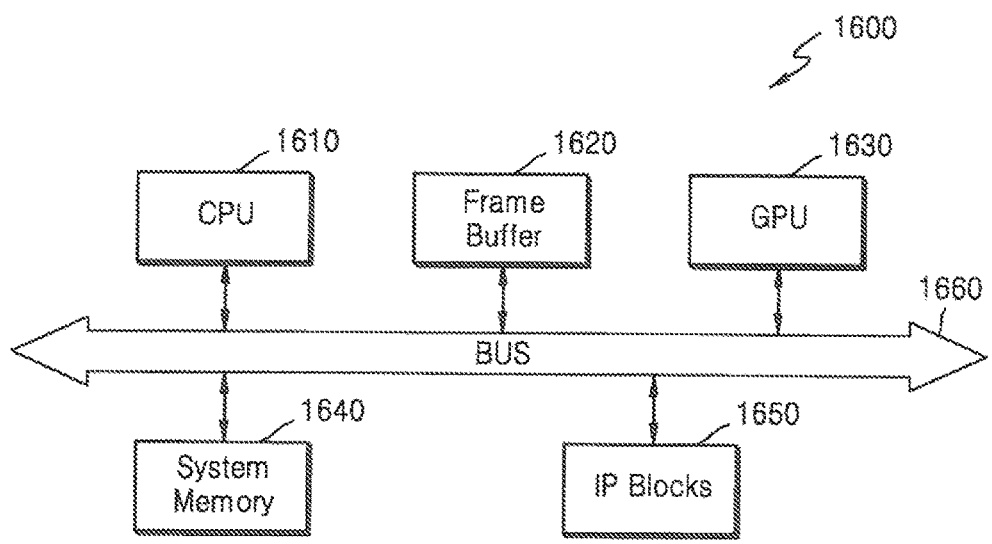
FIG. 16 illustrates a system on chip device according to other example embodiments of the inventive concepts.

FIG. 16 illustrates a system on chip device 1600 according to other example embodiments of the inventive concepts. Referring to FIG. 16, the system on chip device 1600 may include a CPU 1610, a frame buffer 1620, a GPU 1630, a system memory 1640, IP blocks 1650, and a bus 1660 connecting these elements. The CPU 1610 controls an operation of the system on chip device 1600 to execute an application. For example, the CPU 1610 may control displaying image data so as to execute an application. To this end, the CPU 1610 may read data from the frame buffer 1620 that stores image data. The GPU 1630 may provide image data to the frame buffer 1620. The CPU 1610, the frame buffer 1620, and the GPU 1630 may be the CPU 260_1, the buffer memory 220, and the GPU 240_1 of FIG. 4, respectively.

Control information needed for execution of an application may be loaded to the system memory 1640. For example, a compression capability table as described above may be loaded to the system memory 1640. The IP blocks 1650 may perform a specific operation to execute an application. For example, the IP blocks 1650 may perform video codec or process 3D graphics. The CPU 1610 and the GPU 1630 may also be referred to as IP blocks.

The system on chip device 1600 of FIG. 16 may perform an optimized compression operation as described so as to reduce a memory bandwidth and reduce an occupation rate of the bus 1660 for a memory access, thereby increasing flexibility of an operation scenario of the system on chip device 1600 and improving operating characteristics of the same.

Figure 17:
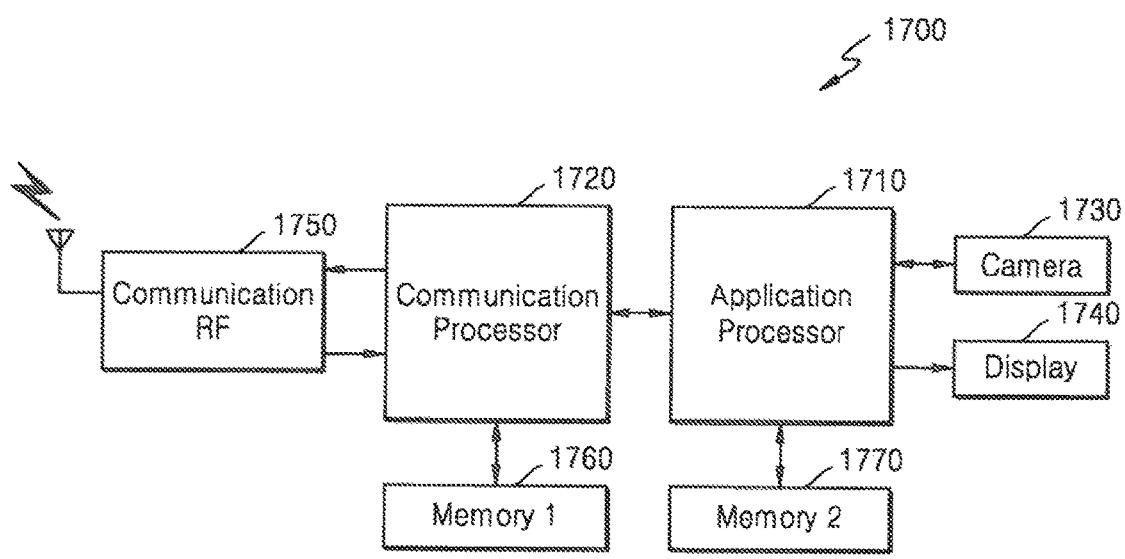
FIG. 17 illustrates a mobile device according to example embodiments of the in concepts.

FIG. 17 illustrates a mobile device 1700 according to example embodiments of the inventive concepts. Referring to FIG. 17, the mobile device 1700 may include an application processor 1710, a communication processor 1720, a camera 1730, a display 1740, a communication radio frequency (RF) 1750, and memories 1760 and 1770. An application may be executed in the mobile device 1700 by using the application processor 1710. For example, when an image is captured using the camera 1730, the application processor 1710 may store the captured image in the second memory 1770 and display the same on the display 1740. The application processor 1710 may be, for example, the system on chip device 200 of FIG. 2 described above. The captured image may be transmitted to the outside via the communication RF 1750 according to control by the communication processor 1720. The communication processor 1720 may temporarily store an image in the first memory 1760 in order to transmit the image. The communication processor 1720 may control communication for telephone calls, data transmission and reception or the like.

Figure 18:
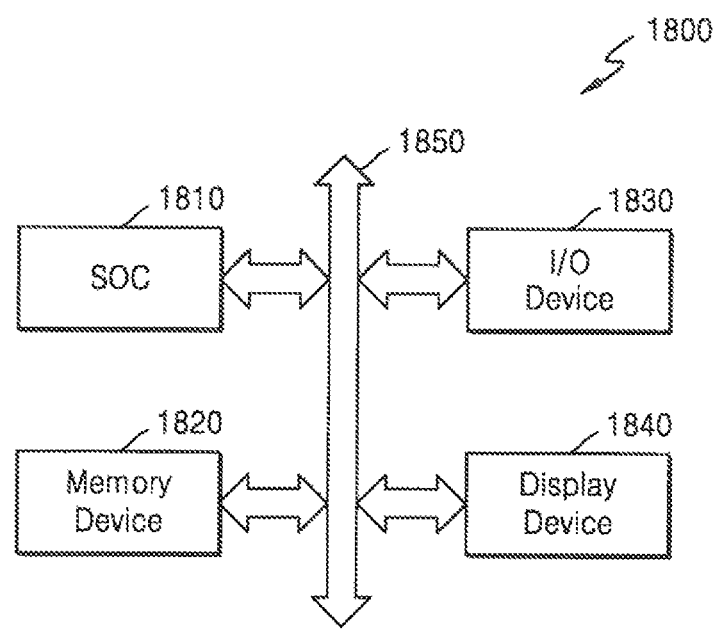
FIG. 18 illustrates a computing system according to example embodiments of the inventive concepts.

FIG. 18 illustrates a computing system 1800 according to example embodiments of the inventive concepts. Referring to FIG. 18, the computing system 1800 such as a mobile device, a desktop computer or a server may further include a system on chip device 1810, a memory device 1820, an input/output device 1830, and a display device 1840, and these elements may be electrically connected to a bus 1850. The system on chip device 1810 of FIG. 18 may be, for example, the system on chip device 200 of FIG. 2.

While the inventive concepts have been particularly shown and described with reference to example embodiments thereof, it will be understood that various changes in form and details may be made therein without departing from the spirit and scope of the following claims.

What is claimed is:

1. An operating method of a system on chip device performed under control of a processor, the operating method comprising:
    setting a first characteristic by analyzing a request for allocation of a buffer memory of the system on chip device;
    allocating a first region of the buffer memory in response to the request for allocation of the buffer memory; and
    compressing or not compressing data provided to the first region, based on the first characteristic,
    wherein the first characteristic is set based on a determination that a compression algorithm performed in a first Intellectual Property (IP) block that is configured to provide the data to the first region is the same as a decompression algorithm performed in a second IP block that is configured to use the data provided to the first region.

2. The operating method of claim 1, wherein the setting of the first characteristic comprises setting the first characteristic based on at least one of a compression capability of the first IP block configured to provide the data to the first region and a decompression capability of the second IP block configured to use the data provided to the first region.

3. The operating method of claim 2, wherein the setting of the first characteristic comprises checking whether the second IP block that is indicated in the request is a central processing unit (CPU).

4. The operating method of claim 2, further comprising storing information about the compression capability of the first IP block or the decompression capability of the second IP block included in the system on chip device.

5. The operating method of claim 1, wherein the setting of the first characteristic comprises setting the first characteristic based on information about the data provided to the first region and defined in the request.

6. The operating method of claim 5, wherein the information about the data provided to the first region and defined in the request comprises information about a color format of the data.

7. The operating method of claim 5, wherein the information about the data provided to the first region and defined in the request comprises information about a transformation of the data.

8. The operating method of claim 1, wherein in the allocating of the first region of the buffer memory, an area for storing the first characteristic is included in the first region.

9. The operating method of claim 1, further comprising allocating a second region of the buffer memory, wherein the second region stores the first characteristic.

10. The operating method of claim 1, further comprising:
    storing compression information indicating whether the data provided to the first region is compressed or not; and
    determining whether the second IP block configured to use the data provided to the first region decompresses the data or not, based on the compression information.

11. The operating method of claim 1, further comprising:
    setting a second characteristic based on an operation environment of the second IP block configured to use the data provided to the first region; and
    determining whether to compress the data provided to the first region based on the second characteristic and the first characteristic.

12. The operating method of claim 1, wherein the processor is a GPU,
    the buffer memory is a frame buffer, and
    data loaded to the buffer memory is image data including color information.

13. An operating method of a system on chip device comprising, for execution of an application, a first Intellectual Property (IP) block configured to provide data to a first region of a buffer memory that is allocated and a second IP block configured to use the data stored in the first region, the operating method comprising:
    checking, by the first IP block, a first flag indicating whether compression is possible or not;
    transmitting, by the first IP block, the data to the first region according to whether the first flag is activated, wherein the data is compressed or not compressed;
    determining whether to activate a second flag based on whether the data transmitted to the first region is compressed or not;
    determining, by the second IP block, whether to decompress data read from the first region or not according to whether the second flag is activated; and
    determining whether to activate the first flag based on at least one of a compression operation environment and a compression operation result of the second IP block.

14. The operating method of claim 13, wherein the determining whether to activate the first flag is performed based on at least one of a format of the data, a size of the data, and whether the data is transformed.

15. The operating method of claim 13, wherein the determining whether to activate the first flag is performed based on a number of decompression modules of the second IP block.

16. The operating method of claim 13, wherein the determining whether to activate the first flag is performed based on whether a first algorithm used by the first IP block to compress the data and a second algorithm used by the second IP block to decompress the data are different from each other.

17. A system on chip device comprising:
    a buffer memory having a first region to which data to execute a first application is loaded;
    a producer configured to provide the data to the buffer memory; and
    a consumer configured to receive the data from the buffer memory,
    wherein the producer is further configured to compress data provided to the buffer memory based on a request for allocation of the memory buffer and a determination that a compression capability of the producer is the same as a decompression capability of the consumer.

* * * * *